United States Patent
Bulatowicz (10) Patent No.: US 9,417,260 B2
(45) Date of Patent: Aug. 16, 2016

(54) OPTICAL ACCELEROMETER SYSTEMS AND METHOD

(71) Applicant: Michael D. Bulatowicz, Canoga Park, CA (US)

(72) Inventor: Michael D. Bulatowicz, Canoga Park, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 279 days.

(21) Appl. No.: 14/103,595

(22) Filed: Dec. 11, 2013

(65) Prior Publication Data

US 2015/0160257 A1    Jun. 11, 2015

(51) Int. Cl.
    *G01P 15/093*     (2006.01)
    *G01P 15/13*     (2006.01)

(52) U.S. Cl.
    CPC ............... *G01P 15/093* (2013.01); *G01P 15/13* (2013.01)

(58) Field of Classification Search
    CPC ..... G01P 15/093; G01P 15/13; G01P 15/131; G01R 33/032; G01R 33/26; G02B 26/008; G02B 26/0808; G02B 26/001; G01J 3/26; G01H 9/00; G01C 19/56; G01C 19/58; G01C 19/62
    USPC ............ 73/514.26, 514.27, 1.38, 504.01; 250/227.21, 251; 356/519; 324/304
    See application file for complete search history.

(56) References Cited

U.S. PATENT DOCUMENTS

| | | | | |
|---|---|---|---|---|
| 4,275,296 A | * | 6/1981 | Adolfsson | G01D 5/268 250/205 |
| 4,992,656 A | * | 2/1991 | Clauser | G01C 19/58 250/251 |
| 5,004,341 A | * | 4/1991 | Grynberg | G01C 19/64 356/459 |
| 6,209,972 B1 | * | 4/2001 | Matsuno | B60T 8/1755 303/140 |
| 6,538,748 B1 | * | 3/2003 | Tucker | G01J 3/26 356/519 |
| 2004/0046111 A1 | | 3/2004 | Swierkowski | |

(Continued)

FOREIGN PATENT DOCUMENTS

| | | |
|---|---|---|
| GB | 1170067 A | 11/1969 |
| JP | 62093603 A | 4/1997 |
| WO | 2008028138 A2 | 3/2008 |

OTHER PUBLICATIONS

Marchant et al., "Off Resonance Laser Frequency Stabilization Using the Faraday Effect", Optics Letters, Optical Society of America, vol. 36, No. 1, Jan. 1, 2011, pp. 64-66.

(Continued)

*Primary Examiner* — Helen Kwok
(74) *Attorney, Agent, or Firm* — Tarolli, Sundheim, Covell & Tummino LLP (57) ABSTRACT

An example optical accelerometer system is provided. An optical beam is provided having a predefined center frequency and is frequency-modulated about the predefined center frequency. An optical cavity includes a first mirror at a first end and a second mirror at a second end of the optical cavity. The second mirror is movable along the axial length of the optical cavity in response to an external acceleration, and the optical cavity receives the optical beam and emits a resonated optical beam. An acceleration detection system measures an intensity of the resonated optical beam and calculates a magnitude of the external acceleration along the axial length of the optical cavity based on the intensity of the resonated optical beam resulting from motion of the second mirror. A stabilization system stabilizes the predefined center frequency of the optical beam independently of the external acceleration based on the modulation of the optical beam.

18 Claims, 3 Drawing Sheets

(56) References Cited

U.S. PATENT DOCUMENTS

| | | |
|---|---|---|
| 2006/0066875 A1 | 3/2006 | Huber et al. |
| 2013/0104655 A1 | 5/2013 | Andersen et al. |
| 2015/0015251 A1* | 1/2015 | Bulatowicz .......... G01C 19/58 324/304 |
| 2015/0316625 A1* | 11/2015 | Bulatowicz .......... G01R 33/032 324/304 |

OTHER PUBLICATIONS

Extended European Search Report for Application No. 14194040.3, mailed Feb. 10, 2015, pp. 1-6.

* cited by examiner

OPTICAL ACCELEROMETER SYSTEMS AND METHOD

TECHNICAL FIELD

The present invention relates generally to sensor systems, and specifically to optical accelerometer systems and method.

BACKGROUND

Many types of instruments have been developed for measuring acceleration. One such example is a force-balanced accelerometer. For example, in a pendulous force-balanced accelerometer, electrostatic forcing in a closed loop system is employed to position and obtain an output from a pendulous inertial mass or proof mass. The electrostatic forcing system may employ a capacitive pickoff electrode on each side of a pendulous member that has been etched from a silicon substrate. A control pulse can be employed to sequentially apply a constant amount of charge or voltage to each electrode. A variable force can be applied to the inertial mass by varying, for example, the amount of time (e.g., duty cycle) the charge or voltage is left on a respective plate. The amount of time the charge or voltage is left on a respective plate is based on the displacement of the inertial mass relative to a null position. However, force-balanced accelerometers can be subject to a number of deleterious phenomena, such as accelerometer bias uncertainty which can be a major source of error in inertial measurement and/or navigation systems. Bias uncertainty can arise due to transient behavior at turn on, non-modelability, and instability of bias versus temperature characteristics including hysteresis and simply trend over time.

SUMMARY

One embodiment of the invention includes an accelerometer system. An optical beam is provided having a predefined center frequency and is frequency-modulated about the predefined center frequency. An optical cavity includes a first mirror at a first end and a second mirror at a second end of the optical cavity. The second mirror is movable along the axial length of the optical cavity in response to an external acceleration, and the optical cavity receives the optical beam and emits a resonated optical beam. An acceleration detection system measures an intensity of the resonated optical beam and calculates a magnitude of the external acceleration along the axial length of the optical cavity based on the intensity of the resonated optical beam resulting from motion of the second mirror. A stabilization system stabilizes the predefined center frequency of the optical beam independently of the external acceleration based on the modulation of the optical beam.

Another embodiment of the invention includes a method for determining an external acceleration. The method includes generating an optical beam having a predefined frequency and providing the optical beam into an optical cavity comprising a first mirror at a first end of an axial length of the optical cavity and a second mirror at a second end of the axial length of the optical cavity. The second mirror can be movable along the axial length of the optical cavity. The method also includes providing a baseline version of a force rebalance signal to a plurality of electrodes to apply a force to the second mirror to provide an oscillatory motion of the second mirror about a neutral position corresponding to an integer multiple of a wavelength of the predefined frequency. The method also includes measuring an intensity of a resonated optical beam corresponding to the optical beam being emitted from the optical cavity. The method also includes setting a magnitude of the force rebalance signal to maintain the oscillatory motion of the second mirror about the neutral position based on the measured intensity of the resonated optical beam. The method further includes determining a magnitude of an external acceleration along the axial length of the optical cavity based on a difference between the magnitude of the force rebalance signal and the baseline version of the force rebalance signal.

Another embodiment of the invention includes combination nuclear magnetic resonance (NMR) gyroscope and acceleration detection system. The system includes an optical accelerometer system comprising an optical cavity configured to receive a first portion of an optical beam having a predefined frequency. The optical cavity includes a first mirror at a first end of an axial length of the optical cavity and a second mirror at a second end of the axial length of the optical cavity. The second mirror can be movable along the axial length of the optical cavity in response to an external acceleration. The optical accelerometer system is configured to calculate a magnitude of the external acceleration along the axial length of the optical cavity based on an intensity of a resonated optical beam resulting from motion of the second mirror. The resonated optical beam can correspond to the first portion of the optical beam emitted from the optical cavity. The system also includes an NMR gyroscope system comprising an atomic vapor cell that comprises an atomic vapor through which a second portion of the optical beam is provided to facilitate precession of the atomic vapor. The NMR gyroscope system can be configured to calculate a rotation about a sensitive axis based on precession of one or more nuclear spin isotopes as measured via a probe beam that is provided through the vapor cell. The system further includes a stabilization system that is configured to stabilize the center frequency of the optical beam approximately equal to an atomic transition frequency of the atomic vapor based on an intensity of the second portion of the optical beam provided through the atomic vapor cell.

DETAILED DESCRIPTION

The present invention relates generally to sensor systems, and specifically to optical accelerometer systems and method. An optical accelerometer system can include an optical cavity having a first mirror at a first axial end and a second mirror at a second axial end. The second mirror can be movable along the axial length, such as based on coupling to a housing of the optical cavity via flexures. The optical accelerometer system can include an optical beam source (e.g., a laser) that provides an optical beam having a predefined center frequency and is frequency-modulated about the center frequency. As an example, the center frequency can be approximately tuned to a transition frequency of an atomic vapor, such as provided in a vapor cell. The optical beam can be provided into the optical cavity and can be emitted from the optical cavity as a resonated optical beam. The optical accelerometer system can include an acceleration detection system that can monitor an intensity of the resonated optical beam to calculate a magnitude of an external acceleration along the axial length. For example, the acceleration detection system can be configured to control force rebalance electrodes that can apply a force (e.g., electrostatic, electromagnetic, or other force) to provide an oscillatory motion of the second mirror about a neutral position corresponding to an integer multiple of the wavelength of the center frequency. Thus, in response to the intensity of the resonated optical beam, the acceleration detection system can change a magnitude of a force rebalance signal that corresponds to the force to maintain the oscillatory motion about the neutral position, such that the changes to the force rebalance signal can correspond to the magnitude of the external acceleration.

Figure 1:
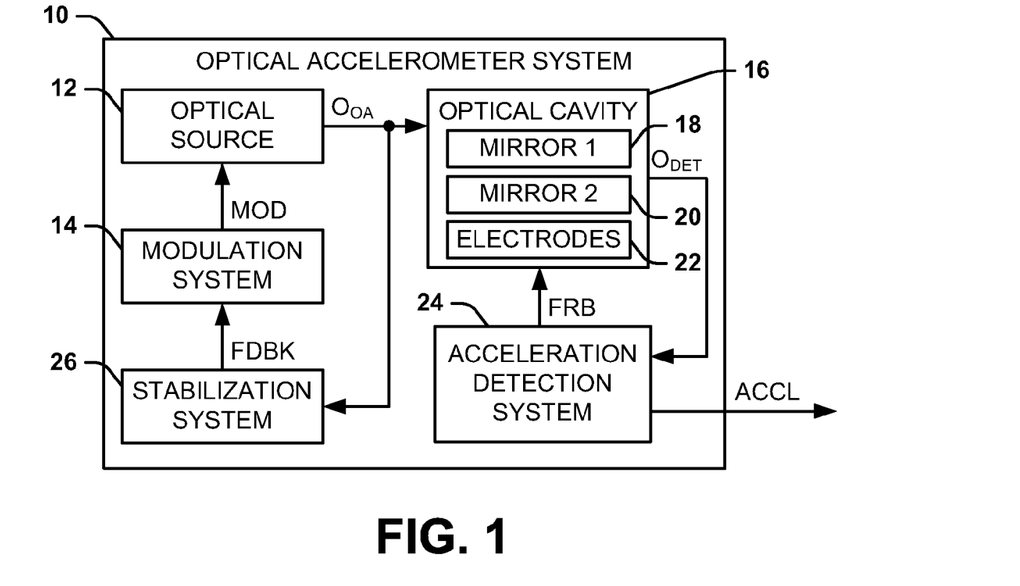
FIG. 1 illustrates an example of an optical accelerometer system.

The optical acceleration system can be included as part of a combination atomic transition locked acceleration sensor (ATLAS) and nuclear magnetic resonance (NMR) gyroscope system. The combination system can include the optical accelerometer, and can also include an NMR gyroscope that includes an atomic vapor cell that comprises an atomic vapor (e.g., alkali metal vapor). The optical beam can be split, such that a first portion of the optical beam is provided in the optical cavity and a second portion of the optical beam is provided through the atomic vapor cell. Thus, the second portion of the optical beam can act as an optical pump beam to facilitate precession of the alkali vapor particles (e.g., via circular polarization). Additionally, because the center frequency of the optical beam can be tuned to a transition frequency of the atomic vapor, the second portion of the optical beam can also be implemented to stabilize the center frequency of the optical beam. Because the optical beam can be frequency-modulated about the stabilized center frequency, the stabilization can be performed independently of the measurement of the external acceleration FIG. 1 illustrates an example of an optical accelerometer system 10. The optical accelerometer system 10 can be configured to calculate an external acceleration of the optical accelerometer system 10 along a sensitive axis. As described herein, an external acceleration is defined as an acceleration of a physical housing of the optical accelerometer system 10 resulting from an external force that is applied to the physical housing of the optical accelerometer system 10, and can include gravity as well as accelerations resulting from other external forces.

The optical accelerometer system 10 includes an optical beam source 12, which can be configured as a laser (e.g., a Vertical Cavity Surface-Emitting Laser (VCSEL) or a Distributed Bragg Reflector (DBR) laser), or an optical fiber or waveguide that provides an optical beam generated from an external source. The optical beam source 12 can generate an optical beam $O_{OA}$ that can be tuned to a predetermined frequency. As an example, the optical beam $O_{OA}$ can have a predetermined center frequency and can be frequency-modulated about the center frequency. As an example, the frequency modulation can result in very small changes in wavelength of the optical beam $O_{OA}$ (e.g., +/− approximately 0.001 nanometers or less). In the example of FIG. 1, the optical beam source 12 can generate the optical beam $O_{OA}$ in response to electrical stimulation, such as a modulated current, that is generated by a modulation system 14. As an example, the modulation system 14 can provide an electric signal MOD (e.g., a current) that has a DC magnitude corresponding to the predefined center frequency, and can be modulated via an AC signal on the electric signal MOD to provide the frequency-modulation of the optical beam $O_{OA}$. As described herein, the modulation system 14 can provide the electric signal MOD based on feedback to maintain the center frequency at the predefined center frequency value, such that the optical beam source 12 provides the optical beam $O_{OA}$ in a stable manner.

The optical beam $O_{OA}$ is provided in an optical cavity 16. As an example, the optical cavity 16 can be configured as a Fabry-Perot optical cavity. The optical cavity 16 includes a first mirror 18 at a first end of an axial length and a second mirror 20 at a second, opposite end of the axial length, such that the optical beam $O_{OA}$ resonates along the axial length between the first and second mirrors 18 and 20. As an example, the first mirror 18 can be at least partially transmissive on a surface opposite the optical cavity 16, such that the optical beam $O_{OA}$ can be provided through the first mirror 18 into the optical cavity 16. The second mirror 20 can be partially transmissive, such that a portion of the optical beam $O_{OA}$ can be emitted through the second mirror 20 as a resonated optical beam $O_{DET}$. As another example, the optical accelerometer system 10 can include a set of optics configured to guide the optical beam $O_{OA}$ into the optical cavity 16, such as non-axially with respect to the axial length of the optical cavity 16. Furthermore, the optical cavity 16 is not intended to be limited to resonating the optical beam $O_{OA}$ in one dimension (e.g., as a Fabry-Perot optical resonator), but could include optics to resonate the optical beam $O_{OA}$ along multiple axes between the first mirror 18 and the second mirror 20.

The optical cavity 16 can have a nominal length that is an integer multiple of the wavelength of the predefined center frequency of the optical beam $O_{OA}$. However, the second mirror 20 of the optical cavity 16 can be movable along the axial length of the optical cavity 16 about a neutral position of the second mirror corresponding to the nominal length of the optical cavity 16. As an example, the second mirror 20 can be coupled to a housing of the optical cavity 16 via flexures. Therefore, the second mirror 20 can move in response to the external acceleration. In the example of FIG. 1, the optical cavity 16 includes electrodes 22 that can be configured to apply a force (e.g., electrostatic, electromagnetic, or other force) to provide force rebalance of the second mirror 20. The magnitude of the force rebalance necessary to maintain the second mirror 20 at the neutral position can be determined based on a magnitude of the resonated optical beam $O_{DET}$.

In the example of FIG. 1, the optical accelerometer system 10 also includes an acceleration detection system 24. The acceleration detection system 24 is configured to monitor an intensity of the resonated optical beam $O_{DET}$ and to provide a force rebalance signal FRB to the electrodes 22 to maintain the second mirror 20 at the neutral position. As an example, the acceleration detection system 24 can demodulate the resonated optical beam $O_{DET}$ at the frequency of the frequency-modulation of the optical beam $O_{OA}$. As a result, the acceleration detection system 24 can determine a change in the position of the second mirror 20 resulting from an external acceleration of the optical cavity 16 along the axial direction. Thus, the acceleration detection system 24 can provide the force rebalance signal FRB to the electrodes 22 to apply the force based on the demodulated intensity of the resonated optical beam $O_{DET}$. As a result, the force can move the second mirror 20 to the neutral position in a feedback manner to substantially counteract the motion of the second mirror 20 resulting from the external acceleration. The magnitude of the force rebalance signal FRB to move the second mirror 20 to the neutral position via the force can be proportional to the magnitude of the external acceleration. Accordingly, the acceleration detection system 24 can calculate the magnitude of the external acceleration, which is demonstrated in the example of FIG. 1 as a signal ACCL that is output from the acceleration detection system 24. In addition, as described herein, the force rebalance signal FRB can be modulated to provide an oscillatory motion of the second mirror 20 about the neutral position.

Figure 2:
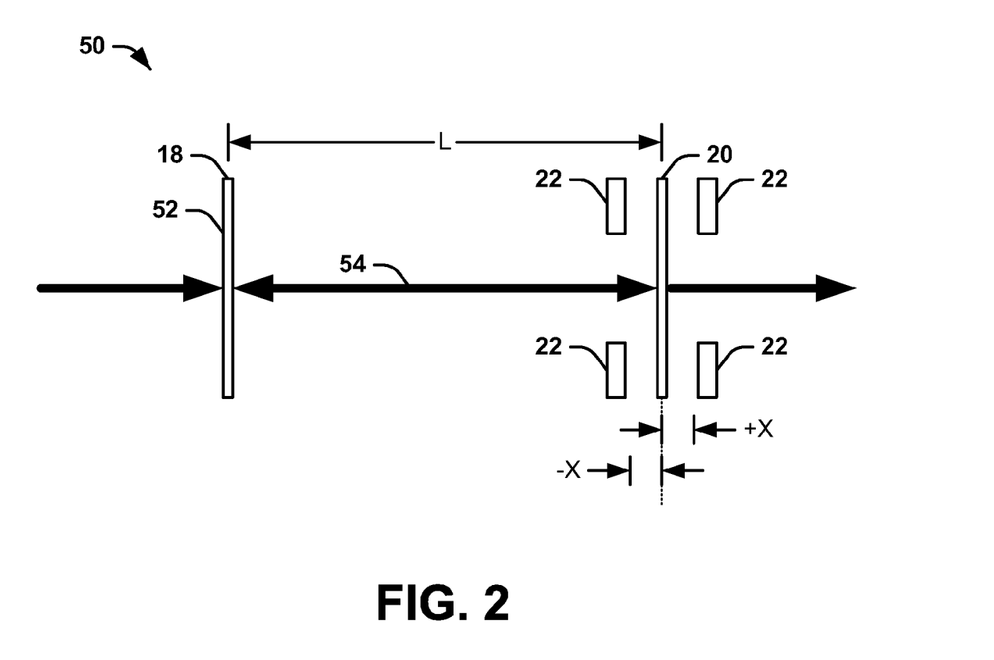
FIG. 2 illustrates an example of an optical cavity system.

FIG. 2 illustrates an example of an optical cavity system 50. The optical cavity system 50 can correspond to the optical cavity 16 in the example of FIG. 1. Therefore, like reference numbers are used in the following description of the example of FIG. 2 as used in the example of FIG. 1.

The optical beam $O_{OA}$ is demonstrated as being provided through a first surface 52 of the first mirror 18, such that the first surface 52 can be at least partially transmissive of the optical beam $O_{OA}$. The optical beam $O_{OA}$ thus resonates between the first mirror 18 and the second mirror 20 in the optical cavity as a resonating beam 54. The second mirror 20 can be partially reflective (e.g., 90% or more reflective), such that a portion of the resonating beam 54 is emitted from the optical cavity system 50 as the resonated optical beam $O_{DET}$. In the example of FIG. 2, the first mirror 18 and the second mirror 20 are nominally separated by a distance of "L" in a neutral position, which can correspond to an integer multiple of the wavelength of the center frequency of the optical signal $O_{OA}$. The second mirror 20 can be movable along an axial length of the optical cavity system 50 (e.g., parallel to the resonating beam 54). Thus, as described previously, the resonated optical beam $O_{DET}$ can be provided to the acceleration detection system 24, such that an intensity of the resonated optical beam $O_{DET}$ can be indicative of motion of the second mirror 20 resulting from the external acceleration.

The optical cavity system 50 includes the electrodes 22 that can apply the force based on the force rebalance signal FRB to provide force rebalance of the second mirror 20. The magnitude of the force rebalance necessary to maintain the second mirror 20 at the neutral position, and thus the distance "L" between the first and second mirrors 18 and 20 can be determined based on a magnitude of the resonated optical beam $O_{DET}$, as described previously. In addition, the force rebalance signal FRB can be modulated to provide an oscillatory motion of the second mirror 20 about the neutral position based on the force provided via the electrodes 22. In the example of FIG. 2, the second mirror 20 can oscillate to increase the length of the optical cavity system 50 from "L" to "L+X" and to decrease the length of the optical cavity system 50 from "L" to "L−X". As an example, the physical oscillation of the second mirror 20 can be significantly greater than the change in wavelength of the optical beam $O_{OA}$ resulting from the frequency modulation. For example, X can be equal to ten or more nanometers. As an example, the acceleration detection system 24 can be configured to demodulate the resonated optical beam $O_{DET}$ at a frequency of the oscillatory motion of the second mirror 20 to generate a DC modulation signal corresponding to the intensity of the resonated optical beam $O_{DET}$ based on the respective control scheme for implementing the oscillatory motion, as described herein.

Figure 3:
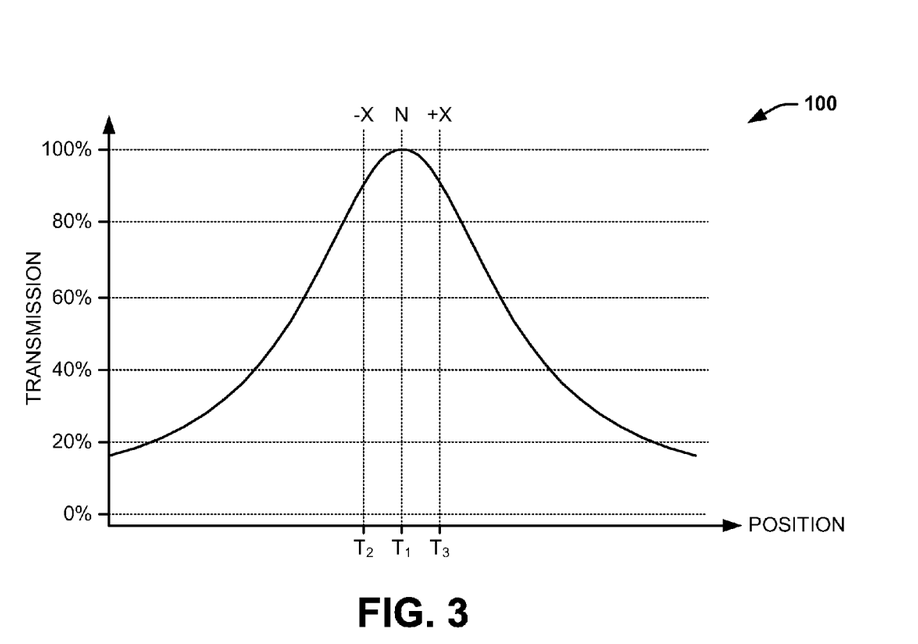
FIG. 3 illustrates an example of a graph of intensity of a resonated optical beam.

FIG. 3 illustrates an example of a graph 100 of transmission of a resonated optical beam. The graph 100 can correspond to transmission of the resonated optical beam $O_{DET}$ through the second mirror 20, and is thus emitted from the optical cavity 16 in the example of FIG. 1 or the optical cavity system 50 in the example of FIG. 2. At the neutral position, demonstrated at position "N" in the graph 100, the resonated optical beam $O_{DET}$ has a peak transmission T1 of approximately 100%, and is thus substantially fully transmissive through the second mirror 20. Additionally, the graph 100 demonstrates a second position "−X" and a third position "+X" that can correspond to the respective bounds of the oscillatory motion of the second mirror 20 about the neutral position "N". At the second position "−X", the resonated optical beam $O_{DET}$ has a transmission T2, and at the third position "+X", the resonated optical beam $O_{DET}$ has a transmission T3 that is approximately equal to the transmission T2 (e.g., approximately 90%). As described previously, the optical beam $O_{OA}$ can be frequency-modulated about a center frequency, such that the length "L" of the optical cavity system 50 can correspond to an integer multiple of the wavelength of the center frequency. Thus, it is to be understood that the transmission T1, T2, and T3 of the resonated optical beam $O_{DET}$ in the example of FIG. 3 can correspond to the center frequency of the resonated optical beam $O_{DET}$, such that the neutral position "N" corresponds to the length "L" of the optical cavity system 50 that is set at an integer multiple of the wavelength of the center frequency.

The acceleration detection system 24 can be configured to generate the force rebalance signal FRB at a baseline value to implement the oscillatory motion of the second mirror 20, and can adjust the force rebalance signal FRB in a feedback manner to maintain the oscillatory motion about the neutral position "N" in a feedback manner. The adjustment to the force rebalance signal FRB can be provided to compensate for the external acceleration and/or other factors that can affect the oscillatory motion of the second mirror 20. The acceleration detection system 24 can be configured to adjust the force rebalance signal FRB based on locking an approximate center of the oscillatory motion onto the peak magnitude transmission T1. In other words, the acceleration detection system 24 can adjust the baseline value to set the force rebalance signal FRB to maintain an approximate center of the oscillatory motion at the peak transmission T1 corresponding to the neutral position "N" based on identifying a peak intensity of the resonated optical beam $O_{DET}$ corresponding to the neutral position "N". As described previously, the resonated optical beam $O_{DET}$ can be demodulated by a frequency of the oscillatory motion of the second mirror 20, such as to provide a DC modulated signal corresponding to the intensity of the resonated optical beam $O_{DET}$.

The oscillatory motion of the second mirror 20 can be implemented in a variety of different ways with respect to the modification of the baseline value of the force rebalance signal FRB. As a first example, the acceleration detection system 24 can implement a time-based control algorithm of the force rebalance signal FRB. For example, the acceleration detection system 24 can provide the force rebalance signal FRB to apply the respective force via the electrodes 22 oppositely with respect to the second mirror 20 in each of predetermined time durations that are based on the calculated magnitude of the external acceleration. In other words, the relative time of application of the forces in the "+X" direction and the "−X" direction can be dynamically adjusted based on an offset of the peak intensity of the resonated optical beam $O_{DET}$ from the neutral position "N". As a second example, the acceleration detection system 24 can implement an AC dither control algorithm of the force rebalance signal FRB. For example, the acceleration detection system 24 can provide a DC signal component of a force rebalance signal FRB corresponding to the force and modulating an AC signal component on the DC signal component to apply the respective force via the electrodes 22, such that the magnitude of the DC signal component of the force rebalance signal FRB is adjusted based on the offset of the peak intensity of the resonated optical beam $O_{DET}$ from the neutral position "N".

As a third example, the acceleration detection system 24 can implement a detection control algorithm of the force rebalance signal FRB. For example, the acceleration detection system 24 can provide the force rebalance signal FRB to apply the respective force via the electrodes 22 based on adding an AC signal component onto the DC demodulation signal and offset to correspond to the intensity of the resonated optical beam $O_{DET}$ at the peak intensity. Thus, the resulting modulated DC signal can be converted to the force rebalance signal FRB for applying the force to the electrodes 22. Other examples can exist for the control scheme for providing the oscillatory motion of the second mirror 20 coupled with detection and calculation of the external acceleration.

As described previously, the optical beam $O_{OA}$ can be frequency-modulated about a center frequency for stabilization of the optical beam source 12. Referring back to the example of FIG. 1, the optical accelerometer system 10 includes a stabilization system 26 configured to substantially stabilize the center frequency of the optical beam $O_{OA}$. The stabilization system 26 is configured to monitor a frequency of a portion of the optical beam $O_{OA}$ relative to a highly-stable frequency reference. For example, the stabilization system 26 can include an atomic vapor cell comprising an atomic vapor, such as an alkali metal vapor (e.g., cesium, rubidium, potassium, etc.). The center frequency of the optical beam $O_{OA}$ can be tuned to a transition frequency of the atomic vapor (e.g., a D1 or a D2 transition frequency), and the portion of the optical beam $O_{OA}$ can be directed through the atomic vapor cell. Therefore, the intensity of the portion of the optical beam $O_{OA}$ exiting the atomic vapor cell can be monitored to determine the wavelength corresponding to the atomic transition reference frequency of the optical beam $O_{OA}$. As an example, the stabilization system 26 can demodulate the intensity of the optical beam $O_{OA}$ at a frequency of the frequency modulation of the optical beam $O_{OA}$. Therefore, the stabilization system 26 can generate a feedback signal FDBK that is provided to the modulation system 14 to stabilize the center frequency of the optical beam $O_{OA}$, such that the center frequency is maintained at the transition frequency of the atomic vapor in the atomic vapor cell. Thus, the optical accelerometer system 10 can be implemented as an Atomic Transition Locked Acceleration Sensor (ATLAS). Accordingly, the optical beam $O_{OA}$ can be implemented in a very stable manner for calculation of the external acceleration based on motion of the second mirror 20 relative to the neutral position "N".

As described previously, the optical beam $O_{OA}$ is frequency-modulated about a center frequency. Therefore, the optical beam $O_{OA}$ can be stabilized independently of the calculation of the external acceleration. In other words, the calculation of the magnitude of the external acceleration can be distinguishable from sources of error, such as electronic and/or temperature drift of the optical beam source 12 that can affect the wavelength of the optical beam $O_{OA}$. In addition, as also described previously, the force rebalance signal FRB can be implemented to provide the oscillatory motion of the second mirror 20, in addition to providing force rebalance of the second mirror 20 in response to the external acceleration for the associated calculation of the external acceleration. The oscillatory motion of the second mirror 20 can be implemented to substantially increase a signal-to-noise ratio (SNR) of detection of the external acceleration while maintaining a more cost effective solution for the optical accelerometer system 10. As an example, implementation of the oscillatory motion of the second mirror 20 can allow for fabrication of the second mirror 20 to have significantly lower finesse than mirrors that are implemented in typical optical cavities. In other words, absent the oscillatory motion of the second mirror 20 in the optical cavity 16, the resonated optical beam $O_{DET}$ could have insufficient SNR for accurate calculation of the external acceleration absent a very high finesse of the first and second mirrors 18 and 20 of the optical cavity 16, which can be very costly and can increase fabrication complexity. Accordingly, the oscillatory motion of the second mirror 20 can be implemented to significantly increase the SNR of the resonated optical signal $O_{DET}$ while allowing for a more cost effective and simple manufacturing solution for the optical cavity 16.

Figure 4:
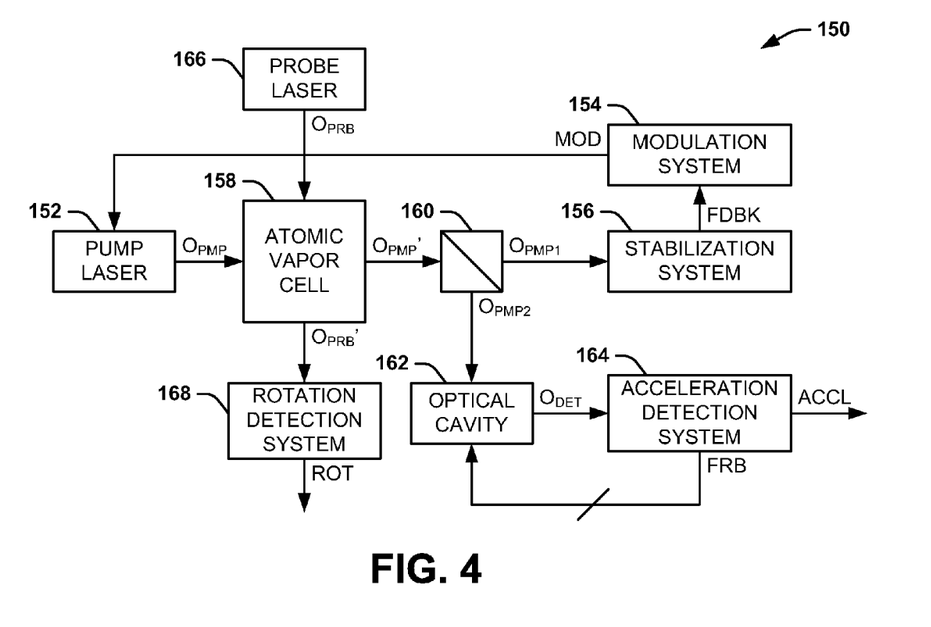
FIG. 4 illustrates an example of a combination atomic transition locked acceleration sensor (ATLAS) and nuclear magnetic resonance (NMR) gyroscope system.

FIG. 4 illustrates an example of a combination atomic transition locked acceleration sensor (ATLAS) and nuclear magnetic resonance (NMR) gyroscope system 150. The combination ATLAS and NMR gyroscope system 150 can be configured to calculate an external acceleration along a first sensitive axis and a rotation about a second sensitive axis. As an example, the first and second sensitive axes can be the same, but are not limited to being the same.

The combination ATLAS and NMR gyroscope system 150 includes a pump laser 152, which can be configured as a VCSEL or a DBR laser configured to provide a circularly-polarized pump beam $O_{PMP}$ (e.g., via a quarter-wave plate). As an example, the pump beam $O_{PMP}$ can have a predetermined center frequency and can be frequency-modulated about the center frequency, similar to as described previously regarding the optical beam $O_{OA}$. In the example of FIG. 4, the pump laser 152 can generate the pump beam $O_{PMP}$ in response to electrical stimulation, such as a modulated current, that is generated by a modulation system 154. As an example, the modulation system 154 can provide an electric signal MOD (e.g., a current) that has a DC magnitude corresponding to the predefined center frequency, and can be modulated via an AC signal on the electric signal MOD to provide the frequency-modulation of the pump beam $O_{PMP}$. The modulation system 154 can provide the electric signal MOD based on a feedback signal FDBK generated by a stabilization system 156 to maintain the center frequency at the predefined center frequency value, such that the pump laser 152 provides the pump beam $O_{PMP}$ in a stable manner, as described herein.

The pump beam $O_{PMP}$ is provided through an atomic vapor cell 158 comprising an atomic vapor, such as an alkali metal vapor (e.g., cesium, rubidium, potassium, etc.). The center frequency of the pump beam $O_{PMP}$ can be tuned to a transition frequency of the atomic vapor (e.g., a D1 or a D2 transition frequency). Therefore, the intensity of a portion of the pump beam $O_{PMP}'$ exiting the atomic vapor cell 158 can be monitored by the stabilization system 156 to determine the wavelength of the pump beam $O_{PMP}$. In the example of FIG. 4, the pump beam $O_{PMP}'$ exiting the atomic vapor cell 158 is split into a first portion $O_{PMP1}$ and a second portion $O_{PMP2}$ by a beam-splitter 160 (e.g., a polarizing beam-splitter). The first portion of the pump beam $O_{PMP1}$ is provided to the stabilization system 156, such that stabilization system 156 can demodulate the intensity of the first portion of the pump beam $O_{PMP1}$ at a frequency of the frequency modulation of the pump beam $O_{PMP}$. Therefore, the stabilization system 156 can generate the feedback signal FDBK that is provided to the modulation system 154 to stabilize the center frequency of the pump beam $O_{PMP}$, such that the center frequency is maintained at the transition frequency of the atomic vapor in the atomic vapor cell 158. Accordingly, the pump beam $O_{PMP}$ can be implemented in a very stable manner for calculation of both the external acceleration and the rotation about respective sensitive axes, as described herein.

The second portion of the pump beam $O_{PMP2}$ is provided to an optical cavity 162. As an example, the optical cavity 162 can be configured as a Fabry-Perot optical cavity. The optical cavity 162 can be configured substantially similar to the optical cavity 16 in the example of FIG. 1 or the optical cavity system 50 in the example of FIG. 3. Thus, the optical cavity 162 can include a first mirror at a first end of an axial length and a movable second mirror at a second, opposite end of the axial length, such that the second portion of the pump beam $O_{PMP2}$ resonates along the axial length between the first and second mirrors. The optical cavity 162 can also include electrodes configured to apply a force (e.g., electrostatic or electromagnetic) to the second mirror in response to a force rebalance signal FRB. A resonated optical beam $O_{DET}$ corresponding to the second portion of the pump beam $O_{PMP2}$ is emitted from the optical cavity 162 (e.g., via the second mirror) and is provided to an acceleration detection system 164.

The acceleration detection system 164 is configured to monitor an intensity of the resonated optical beam $O_{DET}$ and to provide a force rebalance signal FRB to the electrodes of the optical cavity 162 to maintain the second mirror at the neutral position. Additionally, the acceleration detection system 164 can apply the force via the force rebalance signal FRB to provide an oscillatory motion of the second mirror of the optical cavity 162. As an example, the acceleration detection system 164 can demodulate the resonated optical beam $O_{DET}$ at the frequency of the frequency-modulation of the pump beam $O_{PMP}$ and/or at the frequency of the oscillatory motion. As a result, the acceleration detection system 164 can determine a change in the position of the second mirror resulting from an external acceleration of the optical cavity 162 along the axial direction. Thus, the acceleration detection system 164 can adjust the force rebalance signal FRB to the electrodes to apply the force based on the demodulated intensity of the resonated optical beam $O_{DET}$, similar to as described previously in the examples of FIGS. 1-3. Accordingly, the acceleration detection system 164 can calculate the external acceleration, which is provided from the acceleration detection system 164 in the example of FIG. 4 as a signal ACCL.

The pump beam $O_{PMP}$, in addition to being implemented for measuring the external acceleration, is also configured to optically pump the atomic vapor in the atomic vapor cell 158, such as to facilitate precession of the atomic vapor particles in the atomic vapor cell 158. As described previously, the pump beam $O_{PMP}$ can be circularly-polarized (e.g., via a quarter-wave plate), such that the atomic vapor in the atomic vapor cell 158 is caused to precess (e.g., in the presence of an AC magnetic field with which the pump beam $O_{PMP}$ is at least partially aligned). As an example, the precession can be based on an applied AC magnetic field component in one or both of the X- and Y-axes (e.g., with the pump beam $O_{PMP}$ provided along the Z-axis) to stimulate precession of one or more nuclear spin isotope(s) which are nuclear spin-polarized based on a spin-exchange of the atomic vapor having been stimulated by a pump beam $O_{PMP}$. The combination ATLAS and NMR gyroscope system 150 also includes a probe laser 166 that is configured to provide a probe beam $O_{PRB}$ through the atomic vapor cell 158, such as orthogonally with respect to the pump beam $O_{PMP}$ (and/or an applied magnetic field). As an example, the probe beam $O_{PRB}$ can be linearly polarized, such that the probe beam $O_{PRB}'$ that exits the atomic vapor cell 158 can be subject to a Faraday rotation. For example, the Faraday rotation of the probe beam $O_{PRB}$ can be indicative of the precession of the nuclear spin isotope(s) at approximately a Larmor precession frequency based on an induced internal magnetic field affecting the atomic vapor.

The combination ATLAS and NMR gyroscope system 150 further includes a rotation detection system 168 that is configured to calculate a rotation of the combination ATLAS and NMR gyroscope system 150 about a sensitive axis based on the measured precession of the nuclear spin isotope(s). As an example, the rotation detection system 168 can include a pair of photodiodes that monitor respective orthogonal linear polarizations of the probe beam $O_{PRB}'$ exiting the atomic vapor cell 158. For example, a difference value provided between the photodiodes can be indicative of the Faraday rotation of the optical probe beam $O_{PRB}$ as it passes through the atomic vapor cell, based on precession of the alkali metal atoms. The demodulated difference value can correspond to the precession of the nuclear spin isotope(s) which in turn provides information about rotation of the combination ATLAS and NMR gyroscope system 150 about the sensitive axis, which is provided from the rotation detection system 168 in the example of FIG. 4 as a signal ROT.

Therefore, the combination ATLAS and NMR gyroscope system 150 in the example of FIG. 4 demonstrates a manner in which the functionality of an ATLAS and an NMR gyroscope can be combined based on a single accurately stabilized optical beam. It is to be understood that the combination ATLAS and NMR gyroscope system 150 is not intended to be limited to the example of FIG. 4. As an example, while the example of FIG. 4 demonstrates that the first portion of the pump beam $O_{PMP1}$ is provided in the optical cavity 162 after it passes through the atomic vapor cell 158, the beam-splitter 160 can be arranged before the atomic vapor cell 158, such that the first portion of the pump beam $O_{PMP1}$ can be provided in the optical cavity 162 and the second portion of the pump beam $O_{PMP2}$ can be provided through the atomic vapor cell 158. As another example, the combination ATLAS and NMR gyroscope system 150 can include a plurality of atomic vapor cells 158 and/or optical cavities 162, with all of which being provided the pump beam $O_{PMP}$. Therefore, the combination ATLAS and NMR gyroscope system 150 can be configured to measure external acceleration and/or rotation about sensitive axes in two or three respective orthogonal axes.

Figure 5:
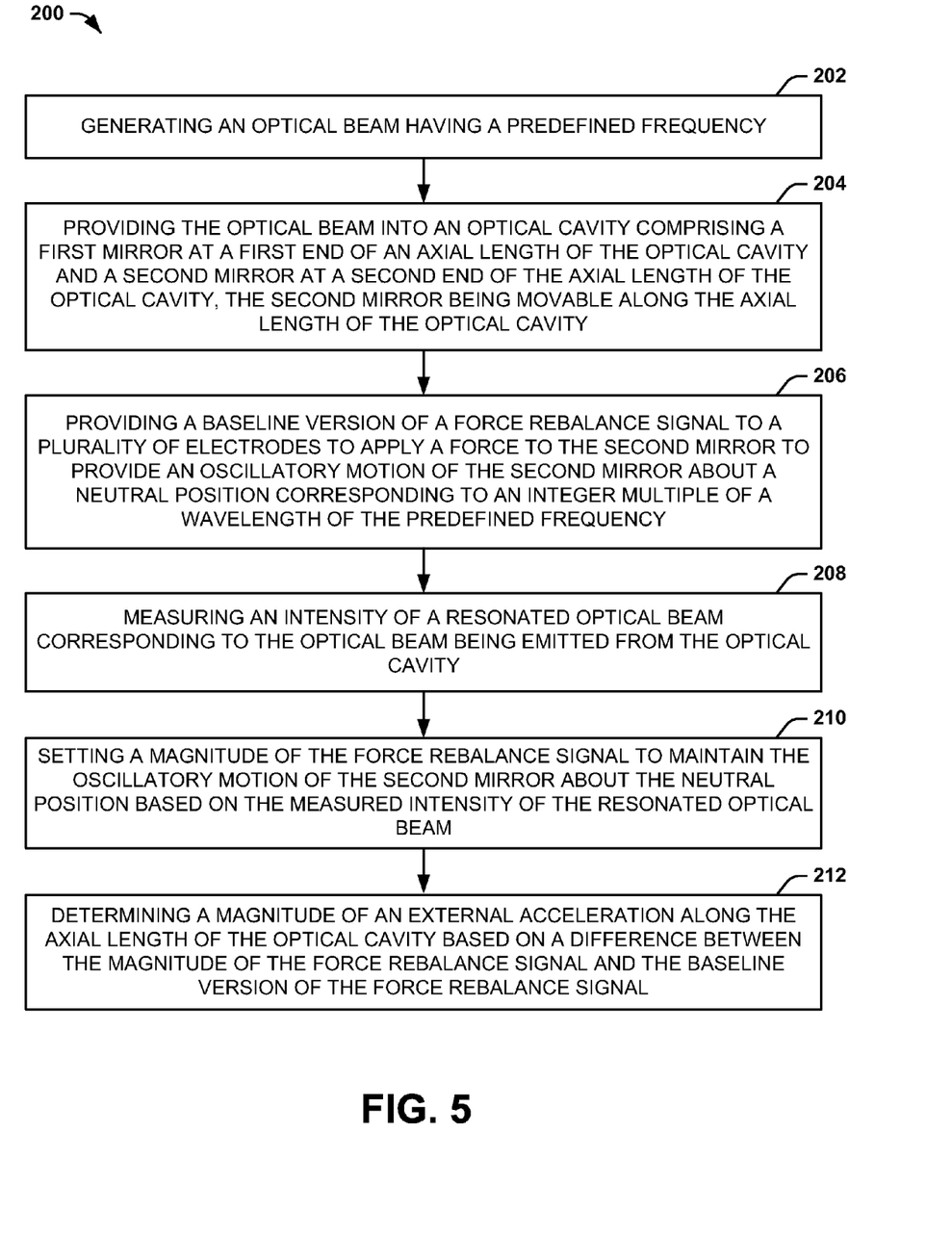
FIG. 5 illustrates an example of a method for determining an external acceleration.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 200 for determining an external acceleration. At 202, an optical beam (e.g., the optical beam $O_{OA}$) having a predefined frequency (e.g., a predefined center frequency about which the optical beam is frequency-modulated) is generated. At 204, the optical beam is provided into an optical cavity (e.g., the optical cavity 16) comprising a first mirror (e.g., the first mirror 18) at a first end of an axial length of the optical cavity and a second mirror (e.g., the second mirror 20) at a second end of the axial length of the optical cavity, the second mirror being movable along the axial length of the optical cavity. At 206, a baseline version of a force rebalance signal (e.g., the force rebalance signal FRB) is provided to a plurality of electrodes (e.g., the electrodes 22) to apply a force to the second mirror to provide an oscillatory motion of the second mirror about a neutral position (e.g., the neutral position "N") corresponding to an integer multiple of a wavelength of the predefined frequency.

At 208, an intensity of a resonated optical beam (e.g., the resonated optical beam $O_{DET}$) corresponding to the optical beam being emitted from the optical cavity is measured. At 210, a magnitude of the force rebalance signal is set to maintain the oscillatory motion of the second mirror about the neutral position based on the measured intensity of the resonated optical beam. At 212 a magnitude of an external acceleration along the axial length of the optical cavity is determined based on a difference between the magnitude of the force rebalance signal and the baseline version of the force rebalance signal.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An accelerometer system comprising:
    an optical beam source configured to generate an optical beam having a predefined center frequency and which is frequency-modulated about the predefined center frequency;
    an optical cavity comprising:
        a first mirror at a first end of an axial length of the optical cavity;
        a second mirror at a second end of the axial length of the optical cavity, the second mirror being movable along the axial length of the optical cavity in response to an external acceleration, the optical cavity being configured to receive the optical beam and to emit a resonated optical beam; and
        a plurality of force rebalance electrodes configured to apply a force to the second mirror in response to a change of the intensity of the resonated optical beam corresponding to an external acceleration along the axial length of the optical cavity, the magnitude of the force corresponding to the magnitude of the external acceleration; and
    an acceleration detection system configured to measure an intensity of the resonated optical beam and to calculate a magnitude of the external acceleration along the axial length of the optical cavity based on the intensity of the resonated optical beam resulting from motion of the second mirror; and
    a stabilization system configured to stabilize the predefined center frequency of the optical beam independently of the external acceleration based on the frequency modulation signal of the optical beam.

2. The accelerometer system of claim 1, wherein the stabilization system comprises an atomic vapor cell comprising an atomic vapor through which a portion of the optical beam is provided, wherein the accelerometer system further comprises a modulation system configured to set the predefined center frequency of the optical beam approximately equal to an atomic transition frequency of the atomic vapor in response to a feedback signal generated by the stabilization system based on an intensity of the portion of the optical beam provided through the atomic vapor cell.

3. The accelerometer system of claim 2, wherein the intensity of the portion of the optical beam is demodulated at a frequency that is approximately equal to a frequency of the frequency modulation of the optical beam.

4. The accelerometer system of claim 1, wherein the plurality of force rebalance electrodes are further configured to apply the force to provide an oscillatory motion of the second mirror about a neutral position corresponding to an integer multiple of a wavelength of the predefined center frequency to increase a signal-to-noise ratio (SNR) of the resonated optical beam.

5. The accelerometer system of claim 4, wherein the intensity of the resonated optical beam is demodulated at a frequency that is approximately equal to a frequency of the oscillatory motion of the second mirror to calculate the magnitude of the external acceleration.

6. The accelerometer system of claim 4, wherein the plurality of force rebalance electrodes are configured to provide the oscillatory motion of the second mirror about the neutral position based on feedback associated with a peak intensity of the resonated optical beam at the neutral position.

7. The accelerometer system of claim 5, wherein the plurality of force rebalance electrodes are configured to apply the force to provide the oscillatory motion of the second mirror in one of:
    a time-based control algorithm to provide the force oppositely with respect to the second mirror in each of predetermined time durations that are based on the calculated magnitude of the external acceleration;
    an AC control algorithm to provide the force via a DC signal component of a force rebalance signal corresponding to the force and modulating an AC component on the DC signal component, a magnitude of the DC signal component of the force rebalance signal being adjusted based on the calculated magnitude of the external acceleration; and
    a detection control algorithm corresponding to providing the AC component on a DC signal corresponding to the intensity of the resonated optical beam at a peak intensity of the resonated optical beam to provide a modulated DC signal, and converting the modulated DC signal to the force rebalance signal.

8. The accelerometer system of claim 1, wherein the optical cavity is a first optical cavity, the system further comprising a second optical cavity and a third optical cavity, each of the second optical cavity and the third optical cavity comprising a first mirror at a first end of an axial length of the respective second and third optical cavities and a second mirror at a second end of the axial length of the respective second and third optical cavities, the second mirror being movable along the axial length of the respective second and third optical cavities, each of the respective second and third optical cavities being configured to receive a respective portion of the optical beam and to emit a respective resonated optical beam, wherein the first, second, and third optical cavities being arranged orthogonally with respect to each other to provide the accelerometer system as a three-axis accelerometer system.

9. A combination nuclear magnetic resonance (NMR) gyroscope and atomic transition locked acceleration sensor (ATLAS) system comprising the accelerometer system of claim 1, the combination NMR gyroscope and ATLAS acceleration detection system further comprising an NMR gyroscope system configured to determine a rotation about a sensitive axis based on the optical beam, and wherein the stabilization system is configured to stabilize the predefined center wavelength of the optical beam based on the NMR gyroscope system.

10. The combination NMR gyroscope and ATLAS system of claim 9, comprising:
- an atomic vapor cell comprising an atomic vapor through which the optical beam is provided, such that the optical beam is further configured to facilitate precession of the atomic vapor, wherein the stabilization system is configured to stabilize the predefined center frequency of the optical beam approximately equal to an atomic transition frequency of the atomic vapor based on an intensity of the optical beam provided through the atomic vapor cell; and
- a probe laser configured to generate an optical probe beam that is provided through the atomic vapor cell to determine a rotation of the NMR gyroscope system about a sensitive axis.

11. A method for determining an external acceleration, the method comprising:
- generating an optical beam having a predefined center frequency;
- providing the optical beam into an optical cavity comprising a first mirror at a first end of an axial length of the optical cavity and a second mirror at a second end of the axial length of the optical cavity, the second mirror being movable along the axial length of the optical cavity;
- providing a baseline version of a force rebalance signal to a plurality of electrodes to apply a force to the second mirror to provide an oscillatory motion of the second mirror about a neutral position corresponding to an integer multiple of a wavelength of the predefined center frequency;
- measuring an intensity of a resonated optical beam corresponding to the optical beam being emitted from the optical cavity by demodulating the resonated optical beam at a frequency that is approximately equal to a frequency of the oscillatory motion of the second mirror;
- setting a magnitude of the force rebalance signal to maintain the oscillatory motion of the second mirror about the neutral position based on the measured intensity of the resonated optical beam; and
- determining a magnitude of an external acceleration along the axial length of the optical cavity based on a difference between the magnitude of the force rebalance signal and the baseline version of the force rebalance signal.

12. The method of claim 11, further comprising:
- frequency-modulating the optical beam about the predefined center frequency; and
- stabilizing the predefined center frequency of the optical beam based on the frequency modulation of the optical beam about the center frequency.

13. The method of claim 12, wherein the stabilizing the predefined center frequency comprises:
- directing a portion of the optical beam through an atomic vapor cell comprising an atomic vapor;
- monitoring an intensity of the portion of the optical beam through the atomic vapor cell; and
- setting the predefined center frequency of the optical beam approximately equal to an atomic transition frequency of the atomic vapor.

14. The method of claim 11, wherein the setting the magnitude of the force rebalance signal to maintain the oscillatory motion of the second mirror about the neutral position comprises setting the magnitude of the force rebalance signal to maintain the oscillatory motion of the second mirror about the neutral position based on feedback associated with a peak intensity of the resonated optical beam at the neutral position.

15. A combination nuclear magnetic resonance (NMR) gyroscope and atomic transition locked acceleration sensor (ATLAS) system comprising:
- an optical accelerometer system comprising an optical cavity configured to receive a first portion of an optical beam having a predefined frequency, the optical cavity comprising a first mirror at a first end of an axial length of the optical cavity and a second mirror at a second end of the axial length of the optical cavity, the second mirror being movable along the axial length of the optical cavity in response to an external acceleration, wherein the optical accelerometer system is configured to calculate a magnitude of the external acceleration along the axial length of the optical cavity based on an intensity of a resonated optical beam resulting from motion of the second mirror, the resonated optical beam corresponding to the first portion of the optical beam emitted from the optical cavity;
- an NMR gyroscope system comprising an atomic vapor cell that comprises an atomic vapor through which a second portion of the optical beam is provided to facilitate precession of the atomic vapor, the NMR gyroscope system being configured to calculate a rotation about a sensitive axis based on precession of one or more nuclear spin isotopes as measured via a probe beam that is provided through the vapor cell; and
- a stabilization system configured to stabilize the center frequency of the optical beam approximately equal to an atomic transition frequency of the atomic vapor based on an intensity of the second portion of the optical beam provided through the atomic vapor cell.

16. The combination NMR gyroscope and ATLAS system of claim 15, wherein the optical cavity comprises a plurality of force rebalance electrodes configured to apply a force to the second mirror in response to a change of the intensity of the resonated optical beam corresponding to the external acceleration along the axial length of the optical cavity, a magnitude of the force corresponding to the magnitude of the external acceleration.

17. The combination NMR gyroscope and ATLAS system of claim 16, wherein the plurality of force rebalance electrodes are further configured to apply the force to provide an oscillatory motion of the second mirror about a neutral position corresponding to an integer multiple of a wavelength of the predefined center frequency to increase a signal-to-noise ratio (SNR) of the resonated optical beam.

18. The combination NMR gyroscope and ATLAS system of claim 15, further comprising a modulation system configured to stabilize the predefined center frequency of the optical beam as a predefined center frequency in response to a feedback signal generated by the stabilization system based on an intensity of the second portion of the optical beam provided through the atomic vapor cell, and to provide frequency modulation of the optical beam about the predefined center frequency.

* * * * *